United States Patent [19]
Hermansen et al.

[11] Patent Number: 5,840,829
[45] Date of Patent: Nov. 24, 1998

[54] PLATEABLE STRUCTURAL ADHESIVE FOR CYANATE ESTER COMPOSITES

[75] Inventors: Ralph D. Hermansen, Northridge; Brian M. Punsly, Torrance; Wai-Cheng Seetoo, Monterey Park, all of Calif.

[73] Assignee: Hughes Electronics Corporation, Los Angeles, Calif.

[21] Appl. No.: 977,031

[22] Filed: Nov. 25, 1997

Related U.S. Application Data

[62] Division of Ser. No. 549,139, Oct. 27, 1995, Pat. No. 5,780,581.

[51] Int. Cl.$^6$ .......................... C08G 63/00; C08L 67/00; B32B 31/00; B31B 1/60
[52] U.S. Cl. .......................... 528/363; 528/271; 528/272; 528/288; 528/297; 528/422; 528/492; 525/187; 525/230; 525/533; 156/1; 156/60; 156/157; 156/274.8; 156/275.5; 156/307.7; 156/326; 156/327; 156/331.4; 427/306; 427/307; 427/337; 427/443.1
[58] Field of Search .......................... 528/271, 272, 528/288, 297, 422, 492, 363; 525/230, 187, 533; 156/331.4, 1, 60, 157, 274.8, 275.5, 307.7, 326–327; 427/306, 307, 337, 443.1

[56] References Cited

U.S. PATENT DOCUMENTS

| | | | |
|---|---|---|---|
| 4,396,679 | 8/1983 | Gaku et al. | 428/412 |
| 4,612,359 | 9/1986 | Hefner | 528/97 |
| 4,780,507 | 10/1988 | Gaku et al. | 525/113 |
| 5,286,530 | 2/1994 | Karas et al. | 427/437 |
| 5,350,635 | 9/1994 | Pokorny | 428/414 |
| 5,385,989 | 1/1995 | Ohya | 525/502 |
| 5,667,884 | 9/1997 | Bolger | 428/323 |
| 5,716,663 | 2/1998 | Capote et al. | 427/96 |
| 5,718,789 | 2/1998 | Gebhardt et al. | 156/154 |

FOREIGN PATENT DOCUMENTS 0516273A  12/1992  European Pat. Off. .

OTHER PUBLICATIONS

XP 002028364, Database WPI, Derwent Publications Ltd., London, GB & JP 03 063 060 A (Sanyo Chem Ind Ltd), Mar. 19, 1991.

*Primary Examiner*—P. Hampton-Hightower
*Attorney, Agent, or Firm*—Elizabeth E. Leitereg; Terje Gudmestad; Michael W. Sales

[57] ABSTRACT

An adhesive is provided for bonding cyanate ester composite parts together which is also plateable with metal once chemically etched. The adhesive comprises a polymeric matrix and a filler of cyanate ester polymer. The polymeric matrix comprises at least one polyepoxide resin and a curing agent, while the cyanate ester polymer filler is present in the adhesive as a powder. In practice, the present adhesive is applied to the surface of cyanate ester composite articles to be bonded and is allowed to cure at room temperature. Thereafter, the surface of the assembly is chemically etched and then plated with metal. The present adhesive enable the complete coverage of the cyanate ester composite assembly with the plated metal, including the adhesive bondlines. A cyanate ester resin structure assembled with the present adhesive composition may, upon plating, replace certain metallic components in such applications as aircraft, spacecraft, and automobiles given its highly conductive and comprehensive metallic coating.

8 Claims, No Drawings

5,840,829

PLATEABLE STRUCTURAL ADHESIVE FOR CYANATE ESTER COMPOSITES

CROSS-REFERENCE TO RELATED APPLICATIONS

This is a division of application Ser. No. 08/549,139 filed Oct. 27, 1995, U.S. Pat. No. 5,780,581. The present application is related to application Ser. No. 08/339,380, filed on Nov. 14, 1994,now abandoned upon filing continuation application Ser. No. 08/638,694 on Apr. 26, 1996 now U.S. Pat. No. 5,739,268 and application Ser. No. 08/549,141, filed on Oct. 27, 1995 and co-pending herewith. The former is directed to a method for preparing the surface of cyanate ester polymer composites for subsequent plating with metal. The method of preparation includes a step of contacting the surface with a preheated solution comprising a quaternary ammonium hydroxide or a primary amine. The latter is directed to a metal-filled adhesive for bonding cyanate ester composites, with both the cyanate ester composites and the metal-filled adhesive being plateable with strong metal adhesion upon treatment by a surface etching process such as that recited in the above-referenced application Ser. No. 08/339,390 U.S. Pat. No. 5,569,493.

BACKGROUND OF THE INVENTION

1. Field of the Invention

The present invention is directed to bonding cyanate ester composites to one another, and more particularly, to an adhesive that bonds cyanate ester composites while also being plateable with strong metal adhesion upon treatment by a surface etching process.

2 Description of Related Art

Metals are commonly employed in manufacturing because they offer high degrees of ductility and strength as well as high conductivity. However, metals are generally heavier than other common materials like plastics and non-metallic composites, such that the positive characteristics attributable to metals often come at the cost of increased product weight. Increased product weight is particularly a concern in industries manufacturing vehicles of transport such as automobiles, aircraft, and spacecraft, as well as payloads of such vehicles, given that increased weight adversely affects fuel economy. Moreover, metals typically have a higher coefficient of thermal expansion than non-metallic composites, such that metals exhibit more dimensional change given temperature differentials.

Accordingly, these industries have increasingly incorporated non-metallic, lighter-weight materials such as plastics into automobiles and aircraft in an effort to economize fuel and to maintain dimensional stability. However, plastics are not universally suitable as substitutes for metals. For example, while plastics offer high degrees of ductility and strength, plastics are relatively nonconductive materials. Thus, plastics cannot supplant metals used as electrical, thermal, or microwave conductors.

It is therefore desirable to plate a metal coating onto plastic, thereby simultaneously realizing the benefits of both metals and plastics. More specifically, metal plating on plastic materials allows the use of these lighter-weight plastic materials for the bulk of components and minimizes the amount of metal required to achieve a highly conductive surface. Of particular interest is metal plating on cyanate ester polymer composites of cyanate ester resin and graphite fiber, since such composites have certain unique advantages that make them very useful for specific applications, such as applications in communications spacecraft. Specifically, cyanate ester polymer composites can be formulated in ways that make them very resistant to even minute dimensional changes that would otherwise occur as a result of temperature changes or the absorption and desorption of moisture in the presence of air.

Two methods have been developed by which a cyanate ester composite surface may be treated in preparation for the subsequent plating of metal, both of which are the subjects of previously-filed applications assigned to the present assignee. An application entitled "Preparation of Cured Cyanate Ester Resins and Composites for Metal Plating" (Ser. No. 08/339,390, filed Nov. 14, 1994 and co-pending herewith, recites treating the surface of cyanate esters polymers and composites with a preheated solution of an alkali metal salt of an alkoxide to achieve greater adhesion between the surface and subsequently-plated metals. A second application filed on even date therewith and entitled "Preparation of Cyanate Ester Polymers and Composites for Metal Plating" (Ser. No. 08/339,380) recites treating the surface with a preheated solution comprising a quaternary ammonium hydroxide or a primary amine.

The above-described surface treatment methods achieve greater adhesion for cyanate ester polymer composites by chemically etching the composite surfaces. Chemical etching textures the composite surfaces, thereby providing mechanical anchoring sites for the plating of metal such that the metal adheres to the composite. Scanning electron micrographs have revealed that surface texturing derives from microcracking in the cyanate ester resin that is wedged between the stiff graphite fibers of the composite.

Adhesion between cyanate ester composites and subsequently-plated metals is further improved by practicing the invention described in an application entitled "Cyanate Ester Films that Promote Plating Adhesion to Cyanate Ester Graphite Composites" (Ser. No. 08/507,178, filed on Jul. 26, 1995, and co-pending herewith. That application recites improving the adhesion between cyanate ester composites and a subsequently-plated metal by applying a film of cyanate ester resin to the composite surface prior to surface etching. The cyanate ester resin film provides a homogenous surface upon which to obtain uniformity of adhesion between the cyanate ester resin composite and a subsequently-plated metal. In the absence of a cyanate ester resin layer, the inconsistent distribution of graphite (or other composite-forming material) across the surface of the cyanate ester resin composite leads to variability in adhesiveness with a subsequently-plated metal.

While the above-described surface treatment methods provide the necessary surface texturing for subsequently plating a metal onto the treated composite surface, structural adhesives presently available to bond cyanate ester composites together plate poorly following such treatments. Cyanate ester composite articles are often pieced together to form complicated structures, since it would be impractical both technically and economically to fabricate complicated structures as a single piece. Since presently-available structural adhesives fail to satisfactorily plate by the same processes used to prepare their cyanate ester composite adherends, structures assembled from cyanate ester composite articles are not comprehensively plated with metal. More specifically, there are delineations in the metal plating at the exposed bondlines. Discontinuities in the plating of composite structures preclude their use in certain sensitive applications, such as satellite microwave circuitry.

Presently, structural adhesives available to bond cyanate ester composite articles together include cyanate ester adhesives and epoxy-based adhesives. While certain commercially-available cyanate ester adhesives may be successfully prepared for metal plating by the above-described surface etching processes, these adhesives require cure temperatures greatly exceeding 120° C., at which graphite fiber reinforced cyanate ester composites warp. In contrast, while certain commercially-available metal-filled epoxy adhesives cure at room temperature to bond cyanate ester composites without warpage, these adhesives either plate poorly following the above-described surface etching treatments or, upon plating, exhibit unacceptably low lap shear and peel strengths. For example, aluminum-filled epoxy adhesives (such as Ciba Geigy's RP4036 with RP1500 hardener) fail to plate properly following treatment by the above-described etching processes without an additional special activation step. Commercially-available silver-filled epoxy adhesives contain large amounts of silver filler to achieve electrical conductivity; as a result, metal subsequently plated onto these adhesives (following surface etching) suffers from low lap shear and peel strengths because of the large amount of filler material.

Thus, a need remains for an adhesive that develops strong bond joints to cyanate ester composites while also being capable of developing strong adhesion to a subsequently-plated metal given surface texturing treatments that are performed simultaneously on the adhesive and its composite adherends. The adhesive must be easy to apply and readily curable at temperatures low enough such that the adherend cyanate ester composite parts are not warped. Finally, the adhesion achieved between the exposed bondline of the adhesive and the subsequently-plated metal must be uniform and reproducible, since a single plating failure in an application such as a satellite microwave circuit can be economically catastrophic.

SUMMARY OF THE INVENTION

In accordance with the present invention, an adhesive is provided such that, when bonding cyanate ester composite articles together, both the composite articles and the adhesive bondline are similarly plateable with metal following surface texturing. The adhesive of the invention comprises a polymer mixture and a filler, with the polymer mixture comprising at least one polyepoxide resin and a substantially stoichiometric amount of curing agent and the filler comprising cured cyanate ester polymer.

In practice, the adhesive of the invention is formulated by providing the cured cyanate ester polymer in powder form and mixing the cured cyanate ester polymer powder with the polymer mixture to form a thoroughly wetted mass. The adhesive is in the form of a flowable paste that is curable at room temperature. To employ the adhesive in the practice of the invention, one simply applies the adhesive to the surface of at least one of the cyanate ester composite articles to be joined and then secures the articles as a mated assembly with the adhesive between and in contact with the articles to bonded. The adhesive then cures at room temperature, thereby bonding the cyanate ester composite articles to one another without exposing the articles to elevated temperatures and the risk of warpage.

The adhesive of the invention may be plated with metal to the same extent possible with cyanate ester polymer composites. More particularly, once the cyanate ester polymer composites are bonded with the present adhesive, the entire assembly may then be etched using a surface texturing technique and subsequently plated with metal. The exposed bondlines of the present adhesives are etched and plated along with the cyanate ester composite articles.

Accordingly, the adhesives of the invention allow industry to securely bond together cyanate ester composite articles such that the exposed bondlines likewise are successfully plated with metal. As such, complex structures boasting the light weight and dimensional stability of cured cyanate ester polymer composites may be assembled from separate parts made of cured cyanate ester resin composites and thereafter etched and plated as a whole. Thus, the assembled cyanate ester composite structures exhibit complete coverage by the plated metal without undesirable delineation by unplated bondlines.

The adhesive and methods of the present invention are expected to have a positive economic impact on the automotive, aircraft, and spacecraft industries. By enabling industry to confidently assemble cyanate ester composite parts into wholly plateable structures, industry need not manufacture complex structures as a single piece, which would be technically and economically challenging if not impossible. Thus, the adhesive of the invention enables the replacement of complex metal structures with lighter-weight, dimensionally-stable assembles made of cured cyanate ester resin composite articles, thereby reducing total product weight and achieving greater fuel efficiency in vehicles of transport.

DETAILED DESCRIPTION OF THE PREFERRED EMBODIMENTS

The adhesive of the present invention develops strong bond joints between cyanate ester composites and is also plateable with strong metal adhesion when etched along with its cyanate ester adherends. Moreover, the adhesive is curable at room temperature so that the cyanate ester composite adherends are not warped by an elevated cure temperature, and the adhesive is rigid and dimensionally stable. The adhesive comprises a polymeric matrix and a filler of cyanate ester polymeric material, as described in greater detail below. All told, the present adhesives enable industry to assemble cyanate ester composite parts into complex structures having unobtrusive, plated bondlines.

The adhesives of the present invention are specifically designed to bond cyanate ester resin composites together, with the composites comprising a cyanate ester resin and a fiber such as graphite or fiberglass. Examples of commercially-available cyanate ester resins that form part of composites benefited in the practice of the invention include, but are not limited to, cyanate ester resin RS12 available from YLA, cyanate ester resins BTCY-1, EX-1502, and EX-1515 available from Bryte, and cyanate ester resin 954-2A available from Fiberite. Examples of commercially-available graphite fibers that form part of cyanate ester resin composites benefited in the practice of the invention include, but are not limited to, XN-80 carbon fibers available from Nippon Granoc, K13B from Mitsubishi, and M55J from Toray. Further, rather than graphite or fiberglass, the composite may comprise Kevlar™ fibers, which are aromatic polyamide fibers that are commercially available from DuPont.

The composition of the present adhesive is based on the use of a combination of selected polyepoxide resins, curing agents, and fillers which will provide a room-temperature curable product that provides strong bonds between cyanate ester composite materials while being plateable with metal following surface texturing. The selection of each of these components is critical in obtaining an adhesive with the desired properties. The purity of the components employed in the practice of the invention is that employed in normal commercial practice in the formulation of cyanate ester resin components.

The polymeric matrix of the present adhesives is composed of at least one polyepoxide resin and a curing agent. The polyepoxide resins suitably employed in the practice of the invention preferably have a viscosity not exceeding 30,000 cP at room temperature, yet are classified as "rigid" epoxy resins. Rigid epoxy resins are defined as epoxy resins having a Shore D measurement exceeding about 75 when cured with diethylene triamine ("DETA"). However, the adhesives of the invention are not so limited and may employ flexible epoxy resins having Shore D measurements of less than 75 when cured with DETA, depending upon the particular application.

Examples of classes of polyepoxide resins suitably employed in the practice of the invention include, but are not limited to, the diglycidyl ether of Bisphenol A and diglycidyl ether of Bisphenol F. Specifically, polyepoxide resins suitably employed in the practice of the invention include, but are not limited to, the following resins which are all commercially available from Shell Chemical Company of Houston, Tex.: (1) a mixture comprising 11% butyl glycidyl ether and 89% diglycidyl ether of Bisphenol A, which has an epoxy equivalent weight of about 175 to 195, and is commercially available under the trade designation EPON 815 and (2) diglycidyl ether of Bisphenol A, which has an epoxy equivalent weight of about 185 to 192, and is commercially available under the trade designation EPON 828. Preferably, EPON 815 and EPON 828 are employed in the practice of the invention. Additionally, B. F. Goodrich 1177 may also be suitably employed; this resin is a diglycidyl ether of Bisphenol A that is commercially available as a two-component mixture with a curative.

A mixture of suitably employed polyepoxide resins may be employed in the practice of the invention.

The curing agents employed in the present invention are chosen to render a cure at room temperature with the selected polyepoxide resins. The primary curing agent component is selected from the class of aliphatic polyamines. Examples of suitably-employed aliphatic polyamines include triethylenetetramine ("TETA"), tetraethylenepentamine ("TEPA"), diethylenetriamine ("DETA"), and N,N-diethyletlanolamine ("DEEA"), all of which are commercially available from E. V. Roberts. TETA and TEPA are polyamines containing both primary and secondary amine groups. TEPA is preferred in the practice of the invention to TETA, which is more volatile. However, as demonstrated in the examples below, neither TEPA nor TETA cure well in air without being against any surfaces, with an air cure resulting in a tacky surface. TEPA provides a less tacky surface than TETA. The primary curing agent may be represented by a single aliphatic polyamine or by a combination of aliphatic polyamines.

In addition to a primary curing agent of aliphatic polyamine(s), a secondary curing agent may be employed in the practice of the invention. The secondary curing agent may be selected from the group of catalytic-type curing agents, which serve reduce surface tackiness in the adhesive. Examples of suitably-employed catalytic-type curing agents include, but are not limited to, tris (dimethyl-amino) methyl phenol, such as commercially available from Air Products under the tradename Ancamine K54, and amine-terminated butadienenitrile rubber, such as commercially available from B. F. Goodrich under the tradename ATBN 1300×6. Ancamine K54 is the preferred secondary curing agent in the practice of the invention.

The amount of curing agent employed in the polymeric matrix is preferably in stoichiometric proportion relative to the polyepoxide resin employed. In general, the amount of curing agent may be varied about ±15 percent from stoichiometry, with little adverse effect on the final product. The severity of adverse effects deriving from employing more or less than the exact stoichiometric amount of curing agent depends upon the functionality of the ingredients employed (e.g., trifunctional epoxy resins fare better than difunctional epoxy resins).

The filler component of the present adhesive composition comprises cured cyanate ester plastic material which has been ground to a powder. Any cyanate ester polymer may be employed in the practice of the invention, but the following four are preferred in the order listed: BTCy-1, E083194-1M, EX-1502, and EX-1515, all of which are commercially available from Bryte Technologies of Milpitas, Calif. The cyanate ester polymer may be used with or without fiber reinforcement, such as provided by graphite fibers such as XN-80 from YLA and T300 from Fiberite. Regardless of the type of cyanate ester polymer or composite employed as the filler component, it must first be cured in the practice of the invention, which is accomplished in accordance with manufacturer instructions. The cured cyanate ester polymer material is preferably ground to a powder and screened such that an average particle size of less than 25 $\mu$m is achieved. To render the cured cyanate ester polymer material more brittle in preparation for grinding, the cured polymer material is preferably frozen (e.g., in liquid nitrogen) prior to grinding.

The cyanate ester polymer filler serves to provide mechanical anchoring sites for a subsequently-plated metal. More particularly, chemical etching processes used to prepare cyanate ester polymer composites for plating actually texturize the surfaces such that there are mechanical anchoring sites for the plating of metal. In short, the chemical etching processes etch away cyanate ester polymer to produce such anchoring sites. When cyanate ester polymer filler is incorporated into an epoxy-based adhesive and the adhesive is subsequently subjected to chemical etching processes for cyanate ester composites, the cyanate ester polymer filler etches away faster than the epoxy matrix, thereby creating the desired texture and mechanical anchoring sites. Notably, if the surface irregularities created by etching are too coarse, the plating will appear coarse, which is an undesirable characteristic. Therefore, it has been determined experimentally that surface texture and resulting plating adhesion for the cured adhesives are optimized by employing filler particle sizes not exceeding about 25 $\mu$m, referring to the diameter of the nominally spheroidal particles comprising the cyanate ester powder.

The filler component should represent at least 15 vol % of the adhesive composition but should not exceed 50 vol %. If insufficient cyanate ester polymer filler is employed, too few mechanical anchoring sites will be created with surface texturing processes and there will be poor adhesion with a subsequently-plated metal. On the other hand, if an excessive amount of cyanate ester polymer filler is employed, there will be insufficient polymeric matrix to provide a strong bond between cyanate ester composite articles.

Optional components for the present adhesive composition include fine ceramic powders having an average particle size of about 5 $\mu$m to lower the coefficient of thermal expansion. Other optional components include UV stabilizers, antioxidants, and various other processing aids such as wetting agents, anti-foaming agents, an dispersing agents, all of which are known and commonly used in the art. The processing aids are preferably employed at a concentration of less than about 5 wt % of the total adhesive composition. These optional additives cannot be added indiscriminately, since any change to the surface chemistry can change the plateability of the adhesive composition.

The adhesive of the present invention is formulated by mixing the liquid polyepoxide resin(s) with the dry ingredients, namely the curing agent(s) and the filler component(s), in their appropriate concentrations until the dry ingredients are thoroughly wetted. Preferably, the dry ingredients are milled into the polyepoxide resin component, for example, using a 3-roll mill. Milling achieves a good blend of resin and curative so that the resulting adhesive is uniform in composition and therefore exhibits higher overall quality. Once the dry ingredients are thoroughly wetted, air is removed from the adhesive mixture by further mixing it under vacuum. The resulting composition has the consistency of a flowable paste. The present adhesives may either be used promptly upon formulation or, the more likely scenario, are frozen to extend their storage life for several weeks. If frozen, the present adhesives may be thawed as needed.

In practice, the present adhesives are applied to at least one of the surfaces of the cyanate ester composite articles to be bonded together. Application may be accomplished with a brush or spatula or any tool capable of spreading the paste-like consistency of the adhesives. The adhesives are preferably applied to a thickness of at least about 0.002 to 0.010 inch. Once the adhesive has been applied, the cyanate ester composite articles to be bonded are pressed together in a mated assembly with the adhesive therebetween. The mated assembly is then preferably clamped in place to avoid any relational movement between the assembled articles until the adhesive has cured, which typically occurs within 24 hours at room temperature, or at a temperature within the range of about 70° and 110° C. Upon cure, the present adhesive composition forms a strong, rigid bond between the cyanate ester composite articles.

The manner in which a cure of cyanate ester composite articles is achieved prior to application of the present adhesive and bonding forms no part of this invention, with a typical curing process being conducted in an autoclave at a temperature ranging from about 250° to 350° C. The length of time required to achieve a cure depends entirely upon the specific cyanate ester composite being cured, while the length of time required to ramp to the cure temperature depends upon the thermal mass and emissivity of the part. Notably, the cyanate ester composite articles may be further prepared for plating by depositing on the surface thereupon a layer consisting essentially of cyanate ester resin prior to curing, bonding, and etching. This procedure is recited in an application assigned to the present assignee and entitled "Cyanate Ester Films that Promote Plating Adhesion to Cyanate Ester Graphite Composites" (Ser. No. 08/507,178 filed on Jul. 26, 1995 and co-pending herewith. Once a layer of uncured cyanate ester is in place, the composite and its resin layer are simultaneously subjected to the curing process, which securely fuses the composite and its resin layer together. Preferably, a cyanate ester resin film having a thickness of about 0.001 inch is applied to the composite surface to achieve a film of resin having a thickness of about 1 to 2 µm on the surface, since much of the cyanate ester resin from the film diffuses into the laminate during curing.

Once the adhesives of the present invention have been employed to form an assembly of cyanate ester composite articles, the entire assembly may then be subjected to chemical etching processes in preparation for a subsequent metal plating. The manner of etching the composite and bondline surfaces forms no part of the present invention and may be accomplished in any appropriate etching process. Preferably, the surface is etched in accordance with the method disclosed in the application entitled "Preparation of Cyanate Ester Polymers and Composites for Metal Plating" (Ser. No. 08/339,380), which recites treating the surface of cyanate ester polymer composites with a preheated solution comprising a quaternary ammonium hydroxide or a primary amine. In general, the method disclosed in this related application, discussed below in greater detail, involves immersing the surface of the cured cyanate ester resin composite to be metal-plated into the preheated solution and rinsing the surface with water and/or alcohol upon removal from the solution.

Accordingly, the first step in pretreating the cyanate ester resin composite assembly involves immersing the assembly surface in a preheated etching solution comprising a quaternary ammonium hydroxide or a primary amine. In the event that a quaternary ammonium hydroxide is chosen to etch the composite, the surface of the cured resin composite is placed in contact with a preheated solution comprising a quaternary ammonium hydroxide ($R_4$—NOH) where R may be represented by an alkyl group, aryl-alkyl group, a hydroxy-alkyl group, or an alkoxy-alkyl group. More specifically, the quaternary ammonium hydroxide may be represented by such compounds as tetrabutylammonium hydroxide, benzyltrimethyl-ammonium hydroxide, tetramethylammonium hydroxide, tetraethylammonium hydroxide, tetrapropylammonium hydroxide, tetrapentylammonium hydroxide, tetrahexylammonium hydroxide, and (2-hydroxyethyl) trimethyl ammonium hydroxide, which is also known as choline. Preferably, the alkyl groups employed have chain lengths ranging from one to six carbon atoms. Each of these quaternary ammonium hydroxide compounds is commercially available. A quaternary ammonium hydroxide solution is effective at a concentration ranging from as little as 4 wt % but may be employed without dilution.

In the event that a primary amine is used to etch the cyanate ester resin composite assembly, the surface of the assembly is placed in contact with a preheated solution comprising a primary amine (R—$NH_2$) where R may be represented by an alkyl group, an aryl-alkyl group, a hydroxy-alkyl group, or an alkoxy-alkyl group. More specifically, suitably-employed primary amines must have a boiling point ("BP") significantly higher than the operating temperature of the solution, which is preferably maintained at a temperature between 80° C. and 125° C. Examples of suitable primary amines include triethylenetetraamine (BP~=266° C.), hexanediamine (BP~=204° C.), octylamine (BP~=175° C.), and ethylenediamine (BP ~=118° C.). Other primary amnines believed suitable include diethylenetriamine, tetraethylenepentaamine, 1,7-diaminoheptane, 2-methyl-1,5-pentanediamine, 1,5-pentanediamine, 1,3-propanediamine, 1,2-propanediamine, 1,4-butanediamine, pentylamine, hexylamine, heptylamine, octylamine, nonylamine, and decylamine. Each of these primary amines is commercially available and is preferably employed without dilution from its commercially-available concentration. Secondary and tertiary amines are not suitable because they either react extremely slowly or not at all. Notably, triethylenetetraamine has both primary and secondary amine groups, but the secondary amine groups are not believed to contribute significantly to texturizing the cyanate ester resin composite surface.

A two-step etching process may be employed using preheated solutions comprising primary amines. More particularly, the cyanate ester resin composite assembly is first immersed in a relatively aggressive primary amine and then immersed in a relatively less aggressive primary amine. Examples of relatively aggressive primary amines are those primary amines within the class of short-chain primary diamines.

Regardless of whether the preheated solution comprises a quaternary ammonium hydroxide or a primary amine, the preheated solution may also optionally comprise an additional solvent, such as ethoxyethanol, propanediol, and pyrrolidone, among others. Such solvents serve various purposes, including to dissolve decomposition products; to dilute the preheated solution; to swell the undecomposed portion of the resin; and to smooth the surface of the resin.

The temperature of the preheated solution is preferably maintained at a temperature within the range of about 80° to 125° C., with the most preferable temperature depending upon the particular cured cyanate ester resin composite being treated. If the temperature is too low, the adhesion achieved may be less than optimal. On the other hand, if the temperature is too high, the chemical reaction rate is greatly accelerated so that the process may be uncontrollable. In reality, the upper temperature limit is often determined by the refluxing temperature of the solution. It is preferable that the process temperature be well below the boiling point of the solution.

To perform the chemical etching treatment, the surface of the cyanate ester composite assembly is immersed in the preheated solution for at least 10 seconds. Preferably, the assembly remains immersed for a period of time ranging from 10 seconds to 20 minutes. An immersion of less than 10 seconds does not adequately prepare the surface for metal plating, while an immersion lasting more than 20 minutes dissolves an excessive amount of resin, resulting in loss of adhesion. At the conclusion of the immersion step, the cyanate ester resin composite assembly is removed from the preheated solution, rinsed, and dried. The assembly surface may be rinsed with water (preferably deionized), an organic solvent, or a combination thereof, with the purpose of rinsing being to smooth the surface and to partially redissolve decomposition products. Solvents that may be employed as rinsing agents include, but are not limited to, those common organic solvents listed above for use in the preheated solution. The assembly surface may be rinsed with room-temperature water and/or organic solvent from a beaker for 5 minutes or more, but typically 30 seconds of rinsing is sufficient. The etched surface is then dried, which is preferably accomplished either by allowing the resin surface to air-dry at room temperature or by blowing the surface dry with a stream of nitrogen. Once dry, the cyanate ester resin composite assembly surface, including any exposed bondlines of the present adhesive composition, is fully prepared for metal plating and may be plated at any time for up to one week.

The method used to perform the metal plating to the cyanate ester resin composite assembly, having been prepared for plating by chemical etching, does not form part of the invention and may be accomplished by any of the conventional processes known in the art, such as electroplating, electroless chemistry, and sputtering. One traditional method entails four basic sequential steps and utilizes both electroless chemistry and electroplating. First, the assembly surface is treated with an acidic solution of palladium chloride and stannous chloride. This acidic solution is available commercially; for example, it is sold under the trade name Cataposit 44 by Shipley. Second, the assembly surface is treated with a hydrochloric acid accelerator, such as commercially-available Accelerator No. 19 from Shipley. Third, the assembly surface is treated with either a nickel or copper electroless plating solution. One electroless nickel plating solution is prepared by combining 150 ml of Solution A with 100 ml of Solution B, both of which are commercially available from Allied Kelite, and then diluting the 250 ml of solution to 1 L with water. Alternatively, an electroless copper solution can be prepared by mixing Enplate Cu-700A (6% by volume), Enplate Cu-700B (6% by volume), Enplate Cu-700C (2.25% by volume), and water. Fourth, and finally, the assembly surface is electroplated with a metal aside from nickel or copper, such as silver. Optionally, the metal-plated assembly surface may then be baked to further harden the metal coating. At the conclusion of the metal plating process, a metal coating will have been applied to the assembly surface, including bondlines of adhesives formulated in the practice of the invention, thereby providing the assembly with a highly conductive surface.

The adhesives of the invention enable one to bond together cyanate ester composite articles into a single assembly without experiencing the absence of plating on the adhesive bondlines. Thus, by employing the present adhesives, the resulting assembly of cyanate ester composite articles exhibits complete coverage by subsequently plated metals. Moreover, the adhesion between the subsequently-plated metals and the adhesive bondlines, like that between the metals and the cyanate ester composites, is generally very good according to ASTM method D3359B performance standards, as discussed in detail in the examples below.

EXAMPLES

To demonstrate the benefits achieved in the practice of the invention, three series of adhesives were formulated and tested. More specifically, a series of epoxy adhesives and a series of cyanate ester adhesives were formulated as reported in Tables I and II below, respectively, for comparison to adhesives formulated in accordance with the invention, which are reported in Table III. In each table, the adhesives have the formulations indicated in the second column of the table.

In general, all of the example adhesives were prepared by combining the reported ingredients and mixing until a thoroughly wetted mass was achieved having the consistency of flowable paste. The adhesive mixtures were degassed prior to application to the substrate. With particular regard to the adhesives of Table III, an attempt was made to produce the cyanate ester powder by curing the cyanate ester material then freezing it in liquid nitrogen before grinding into a fine powder using an Osterizer blender. The ground materials were then passed through mesh nos. 104, 200, and 325 sieves and separated into 106 $\mu$m, 74 $\mu$m, and 45 $\mu$m sizes, respectively. The yields were very small from the screening process, especially for the 45 $\mu$m size, even though repeated numerous times. Thus, the blender did not achieve sufficient particle-size reduction.

To achieve sufficient particle-size reduction to less than about 25 $\mu$m, a more aggressive process was conducted in which the cast materials were first subjected to pre-crushing and then cryogenic (−300° F.) milling. The milling was conducted 20 times at 20,000 rpm centrifugal force, and the particles were then classified to yield 75 $\mu$m and 25 $\mu$m sizes.

The prepared adhesives were applied to either coupons of cured cyanate ester composite or occasionally to G-10 for economic reasons during early screening trials. More specifically, panels comprising a cyanate ester resin and graphite fibers were cured using conventional cure cycles as specified by the vendor of the composite. The panels were then cut into plating coupons measuring about 1 inch×1 inch×0.02 inch. The coupons were masked twice with 3M Scotch brand A11280 tapes with a square-shaped hole in the center. The square surface of the cyanate ester composite coupons were abraded and solvent wiped prior to the adhesive bonding. The square patch of the adhesive applied to the coupons was approximately 0.53 inch×0.53 inch×0.008 inch.

The adhesives were allowed to cure at room temperature (although a few were cured at 150° F. as indicated) at cure times specified for each formulation in the tables. The coupons were cured with the adhesive patches either exposed to air at room temperature, against Teflon™ lamination at room temperature, against mold-released coated stainless steel, or in an oven at elevated temperatures. After cure, the masked tapes were removed and the coupons were labeled accordingly. The cured adhesive-coated coupons were then etched using a two-step process wherein the coupon surface was first immersed in a relatively aggressive primary amine followed by immersion in a relatively non-aggressive primary amine.

The etched adhesive coating was then plated with a first layer of copper followed by a second layer of silver. More particularly, the adhesive-coated coupons surfaces were first cleaned with acidic solutions then plated with copper by immersion in an electroless plating solution and finally electroplated with silver.

Thereafter, the adhesion between the adhesive-coated panel surface and the metal plating was determined in accordance with a modified version of ASTM method D3359 "Test Method B—Cross-Cut Tape Test" (hereinafter "ASTM method D3359B") which is specifically used to assess the adhesion of coating films to metallic substrates by applying and removing pressure-sensitive tape over cuts made in the film. In the standard D-3359 tape test, a cross-hatch pattern (about 1 inch×1 inch) is scribed through the metallic plating with a razor sharp instrument. To this surface a pressure sensitive tape with an adhesion of 40 to 45 oz./in.-width is applied and peeled. Depending upon how many squares of plating are removed from the substrate by peeling the tape, a numerical rating is ascribed to the test. The best adhesion rating is a "5", which is designated when no plating is removed from the surface during the peel.

Rather than employ tapes having adhesion ranging from 40 to 45 oz./in.-width as specified in ASTM D-3359, a range of pressure-sensitive tapes were employed that had been calibrated to various levels of plating adhesion. More particularly, pressure-sensitive tapes were calibrated beginning at 45 oz./in.-width up to 150 oz./in.-width plating adhesions. As such, this modified ASTM D-3359 test is more aggressive than the standard ASTIM D-3359 test described above. With specific regard to the adhesives reported in Table III, their adhesiveness was tested with 150 oz./in.-width tape.

In addition to the above-described adhesion test for the adhesive patch, a modified form of ASTM D-3359 was performed to test the thin bondline adhesion. The cross-hatch pattern associated with the thin bondline test was much smaller than the above-described test: the bondline test was cross-hatched over an area of about 1 inch×0.03 inch. As a result, only seven of the cross hatch squares straddled the bondline. Part of the squares were on the plated graphite cyanate ester coupons on either side of the butt joint. The following scoring system for adhesion was adopted for the cross-hatched plating on the bondline after the tapes were pulled:

5=perfect adhesion
4=slight delamination along the edges of the cut
3=a surface area equal to one full square of plating was removed
2=two squares of plating removed
1=three squares of plating removed
0=more than half of the cross-hatch region removed It is noted that bondline adhesion is generally higher than adhesion to a large patch of adhesive.

Referring now to Table I, the epoxy-based adhesives without cyanate ester filler are presented. On the whole, the epoxy adhesive formulations show poor plating and poor adhesion. Within 79 formulation trials, only the following formulations had good adhesion with the 150 oz./in.-width tape using ASTM D3359 on entire patches of resin: B. F. Goodrich 1177 (formulation no. 12), B. F. Goodrich 1273 (formulation nos. 17 and 18), Epiphen 825 filled with CAT-119 (formulation no. 14), Hysol 9395 (formulation no. 16), and Hysol 9394 (formulation no. 15). However, these results were anomalous, since a retesting showed no adhesion for all these formulations at only 20 oz./in.-width tape. Therefore, it is concluded that none of the epoxy adhesive formulations in Table I can be reliably plated on patches of pure resin.

With regard to the cyanate ester adhesives of Table II, these adhesives exhibit good etching and plating but show poor adhesion strengths. The tackiness of the specimens indicates that the pure cyanate ester adhesives were not completely cured. Cure temperatures of 200° F. proved to be insufficient to properly cure the cyanate ester adhesives, which instead remained tacky to the touch. In practice, the minimum temperatures to cure E083194-1M and EX-1502 are 250° F. for three hours while BTCy-1 and EX-1515 require a cure temperature of 350° F. for about two hours.

Referring to Table III, therein are reported adhesives formulated in accordance with the present invention. In general, adhesives formulated in accordance with the invention exhibit adhesion ratings of "5" at 150 oz./in.-width using ASTM D3359. One exception was when a TEPA- or TETA-cured adhesive is cured against Teflon™ surfaces. More specifically, the cure for TEPA- and TETA-cured adhesives in air without being against any surfaces such as steel or Teflon™ remains tacky. However, these TEPA- and TETA-based adhesives were laminated and non-tacky when cured against steel or Teflon™. This is not a result of interaction with the atmosphere, as it also occurs in a nitrogen environment. It seems to be a surface chemistry phenomenon. The problem is complicated, as it has been shown empirically that it is related to the interaction of the amine curative and the cyanate ester filler.

The examples of Table III clearly show the need to employ a particle size of less than about 25 $\mu$m for the cyanate ester powder filler, examples that employed a particle size of about 45 $\mu$m repeatedly had less plating adhesion. Therefore, although grinding the cyanate ester polymer into fine powder having a particle size of less than about 25 $\mu$m is technically challenging, it was imperative to the quality of adhesion.

Room temperature cure provides the best plating adhesion. Curing the epoxy at elevated temperatures increases the amount of cross-linking of the polymer and makes the epoxy more difficult to etch with the amine. Since the cyanate ester filler tends to be coated with epoxy, and because there is not enough surface texturing, not enough filler is etched away. Thus, a room temperature cure provides the strongest amine attack and the best surface texturing for surface adhesion after etching.

The experimental data in Table III illustrates that BTCy-1 filler provides the best results in etching and plating of the cyanate ester polymers tested, and particularly showed the smoothest texture after the process. The cyanate ester powders ranging from best performance to worst performance according to this experimental data are as follows: BTCy-1, E083194-1M, EX-1502, and EX-1515.

Finally, both EPON 815 and EPON 828 epoxy adhesives showed acceptable qualities. EPON 815 and EPON 828 primary differ in their viscosities: EPON 815 has a lower viscosity that was more easily mixed with cyanate ester powder.

TABLE I

Epoxy Adhesive Formulation

| ID # | Formulation | Cure Condition | Total Cure Time (R.T.) | Plating Texture (Graininess) | ASTM D3359 Tape Test Patch (oz) | Bondline (oz) |
|---|---|---|---|---|---|---|
| 1 | 100 g Epon 815<br>3 g Cabosil<br>12 g TETA | Exposed in air | 7 days | 5 | | 2+<br>(90 oz) |
| 2 | 50 g (67%)Epon g 15<br>25 g (33%) Graphite 130E<br>6 g TETA | Exposed in air | 3 days | 4 | | 2+<br>(90 oz) |
| 3 | Hysol 9395 A&B 15% Cat 119 | Exposed in air | 8.5 days | 5 | | 5−<br>(135 oz) |
| 4 | Hysol 9394 A&B | Exposed in air | 7.5 days | 5 | | 5−<br>(135 oz) |
| 5 | BF Goodrich 1177 A&B | Exposed in air | 8.5 days | 5 | | 2<br>(135 oz) |
| 6 | 100 g Epon 815*<br>12 g TETA | Exposed in air | 2 days | 5 | 0<br>(45 oz) | 5−*<br>(135 oz) |
| 7 | Hysol 9395 A&B 15% Cat 119 | Exposed in air | 68 hrs | 5 | | 3<br>(90 oz) |
| 8 | Hysol 9394 A&B | Exposed in air | 42 hrs | 5 | | 4<br>(90 oz) |
| 9 | B. F. Goodrich 1177 A&B | Exposed in air | 67 hrs | 5 | | 3−<br>(90 oz) |
| 10 | Epiphen 825 Kit 15% Cat 119 | Exposed in air | 66 hrs | 5 | | 1+<br>(90 oz) |
| 11 | B. F. Goodrich 1177 A&B | Exposed in air 200° C./2 hr | 2 weeks | 5 | 0<br>(70 oz) | |
| 12 | B.F. Goodrich 1177 A&B | Exposed in air | 3 days | 5 | 0<br>(20 oz) | 3<br>(150 oz) |
| 13 | B. F. Goodrich 1177 A&B | 200° C./1 hr | 3 days | 4 | 0<br>(20 oz) | 0<br>(45 oz) |
| 14 | Epiphen 825 Kit 15% Cat 119 | Exposed in air | 1 days | 5 | 0<br>(20 oz) | 4<br>(150 oz) |
| 15 | Hysol 9394 A&B | Exposed in air | 1 days | 4 | 0<br>(20 oz) | 3<br>(150 oz) |
| 16 | Hysol 9395 A&B 15% Cat 119 | Exposed in air | 1 day | 4 | 0<br>(20 oz) | 4<br>(150 oz) |
| 17 | B. F. Goodrich 1273 A&B | Exposed in air | 1 day | 3 | 0<br>(20 oz) | 2<br>(150 oz) |
| 18 | B. F. Goodrich 1273 A&B | 200° C./1 hr | 1 day | 5 | 0<br>(20 oz) | 0<br>(90 oz) |
| 19 | 25 g Epiphen 825<br>3 g Modifier<br>10 g Mica<br>4 g Converter | 100° C./1 hr | | 3 | 0<br>(45 oz) | |
| 20 | 25 g Epiphen 825<br>3 g Modifier<br>10 g CaCO$_3$<br>4 g Converter | 100° C./1 hr | | 3 | 0<br>(45 oz) | |
| 21 | 25 g Epiphen 825<br>3 g Modifier<br>20 g CaCO$_3$<br>4 g Converter | 100° C./1 hr | | 5 | 0<br>(45 oz) | |
| 22 | 25 g Epiphen 825<br>3 g Modifier<br>30 g CaCO$_3$<br>4 g Converter | 100° C./1 hr | | 5 | 0<br>(45 oz) | |
| 23 | 25 g Epiphen 825<br>3 g Modifier<br>Fluidized CaCO$_3$<br>4 g Converter | | 2 days | 5 | 0<br>(45 oz) | |
| 24 | 25 g Epiphen 825 | 100° C./2 hr | | 2 | 0 | |

TABLE I-continued

Epoxy Adhesive Formulation

| ID # | Formulation | Cure Condition | Total Cure Time (R.T.) | Plating Texture (Graininess) | ASTM D3359 Tape Test Patch (oz) | Bondline (oz) |
|---|---|---|---|---|---|---|
|  | 3 g Modifier<br>10 g Mica 4×<br>4 g Converter |  |  |  | (45 oz) |  |
| 25 | 25 g Epiphen 825<br>3 g Modifier<br>10 g Rubber Particles<br>4 g Converter | 100° C./2 hr |  | 5 | 0<br>(45 oz) |  |
| 26 | 25 g Epiphen 825<br>3 g Modifier<br>10 g Mica 4×<br>4 g Converter |  | 2 days | 5 | 0<br>(45 oz) |  |
| 27 | 25 g Epiphen 825<br>3 g Modifier<br>10 g Rubber Particles<br>4 g Converter |  | 2 days | 3 | 0<br>(45 oz) |  |
| 28 | 25 g Epiphen 825<br>3 g Modifier<br>10 g Mica<br>4 g Converter | 100° C./1 hr |  | 3 | 0<br>(45 oz) |  |
| 29 | 25 g Epiphen 825<br>3 g Modifier<br>10 g CaSO$_4$(4.0 μm)<br>4 g Converter | 100° C./1 hr |  | 4 | 0<br>(20 oz) |  |
| 30 | 25 g Epiphen 825<br>3 g Modifier<br>10 g CaSO$_4$(4.0 μm)<br>4 g Converter |  | 1 day | 5 | 2<br>(45 oz) |  |
| 31 | 25 g Epiphen 825<br>3 g Modifier<br>Fluidized CaCO$_3$(for 1 min)<br>4 g Converter | 100° C./1 hr |  | 4 | 0<br>(20 oz) |  |
| 32 | 25 g Epiphen 825<br>3 g Modifier<br>Fluidized CaCO$_3$(for 1 min)<br>4 g Converter |  | 1 day | 3 | 0<br>(20 oz) |  |
| 33 | 25 g Epiphen 825<br>3 g Modifier<br>Fluidized CaCO$_3$(for 2 min)<br>4 g Converter | 100° C./1 hr |  | 4+ | 0<br>(20 oz) |  |
| 34 | 25 g Epiphen 825<br>3 g Modifier<br>Fluidized CaCO$_3$(for 5 min)<br>4 g Converter | 100° C./1 hr |  | 4 | 0<br>(20 oz) |  |
| 35 | 25 g Epiphen 825<br>3 g Modifier<br>Fluidized CaCO$_3$(for 8 min)<br>4 g Converter |  | 1 day | 5 | 0<br>(20 oz) |  |
| 36 | 25 g Epiphen 825<br>3 g Modifier<br>Sprayed CaCO$_3$<br>4 g Converter |  | 1 day | NT | 0<br>(20 oz) |  |
| 37 | 38 g DEN 438<br>5.75 g Epon 862<br>6.25 g Heloxy 58005<br>10 g 75% DEEA. 25% DETA | 100° C./1 hr |  | 4+ | 0<br>(20 oz) |  |
| 38 | 38 g DEN 438<br>5.75 g Epon 862<br>6.25 g Heloxy 58006<br>10 g 75% DEEA, 25% DETA | 100° C./1 hr |  | 4+ | 0<br>(20 oz) |  |
| 39 | 20 g DEN 438<br>5 g Heloxy 5048<br>10 g Mica 4×<br>3 g ATBN 1300 × 6<br>4 g 75% DEEA, 25% DETA | 100° C./1 hr |  | 4+ | 0<br>(20 oz) |  |
| 40 | 38 g DEN 438<br>5.75 g Epon 862 |  | 1 day | 4− | 0<br>(45 oz) |  |

TABLE I-continued

Epoxy Adhesive Formulation

| ID # | Formulation | Cure Condition | Total Cure Time (R.T.) | Plating Texture (Graininess) | ASTM D3359 Tape Test Patch (oz) | Bondline (oz) |
|---|---|---|---|---|---|---|
| 41 | 6.25 g Heloxy 58005<br>10 g 75% DEEA, 25% DETA<br>38 g DEN 438<br>5.75 g Epon 862<br>6.25 g Heloxy 55006<br>10 g 75% DEEA, 25% DETA | | 1 day | 5 | 1 (45 oz) | |
| 42 | 20 g DEN 438<br>5 g Heloxy 5048<br>10 g Mica 4x<br>3 g ATBN 1300 × 6<br>4 g 75% DEEA, 25% DETA | | 1 day | 5 | 0 (45 oz) | |
| 43 | 50 g Hysol EA9395 part A<br>8.5 g Hysol EA9395 part B | 100° C./1 hr | | 4 | 0 (20 oz) | |
| 44 | 50 g Hysol EA9395 part A<br>8.5 g Hysol EA9395 part B | | 1 day | 5 | 0 (20 oz) | |
| 45 | 25 g DEN 438<br>25 g Heloxy 58598<br>5 g 50% DEEA, 50% DETA | 100° C./1 hr | | 3 | 0 (20 oz) | |
| 46 | 388 DEN 438<br>5.75 g Epon 862<br>6.25 g Heloxy 58005<br>5 g 50% DEEA, 50% DETA | 100° C./1 hr | | 4+ | 0 (20 oz) | |
| 47 | 38 g DEN 438<br>5.75 g Epon 862<br>6.25 g Heloxy 58006<br>5 g 50% DEEA, 50% DETA | 100° C./1 hr | | 4+ | 0 (20 oz) | |
| 48 | 25 g DEN 438<br>25 g Heloxy 58598<br>5 g 50% DEEA. 50% DETA | | 1 day | 3− | 3 (45 oz) | |
| 49 | 38 g DEN 438<br>5.7S g Epon 862<br>6.25 g Heloxy 58005<br>50% DEEA, 50% DETA | | 1 day | 5 | 1 (45 oz) | |
| 50 | 38 g DEN 438<br>5.75 g Epon 862<br>6.25 g Heloxy 58006<br>50% DEEA. 50% DETA | | 1 day | 4 | 0 (20 oz) | |
| 51 | B. F. Goodrich 1177 A&B | 100° C./1 hr | | 3− | 0 (20 oz) | |
| 52 | B. F. Goodrich 1177 A&B | | 1 day | 4 | 5 (150 oz) | |
| 53 | B. F. Goodrich 1273 A&B | 100° C./1 hr | | 4 | 0 (20 oz) | |
| 54 | B. F. Goodrich 1273 A&B | | 1 day | 4 | 5 (150 oz) | |
| 55 | B. F. Goodrich 1177 A&B<br>10% Cat 119 | | 1 day | 4 | 5 (150 oz) | |
| 56 | B. F. Goodrich 1177 A&B<br>20% Cat 119 | | 1 day | 4 | 5 (150 oz) | |
| 57 | B. F. Goodrich 1273 A&B<br>10% Cat 119 | | 1 day | 4 | 5 (150 oz) | |
| 58 | B. F. Goodrich 1273 A&B<br>20% Cat 119 | | 1 day | 4 | 3 (150 oz) | |
| 59 | 25 g Epiphen 825<br>3 g Modifier<br>2.5 g Cat 119<br>4 g Converter | | 1 day | 3− | 5 (150 oz) | |
| 60 | 25 g Epiphen 825<br>3 g Modifier<br>5.0 g Cat 119<br>4 g Converter | | 1 day | 3− | 4 (150 oz) | |
| 61 | 50 g Hysol EA9395 part A<br>8.5 g Hysol EA9395 part B<br>5.0 g Cat 119 | | 1 day | 4 | 5 (150 oz) | |
| 62 | 50 g Hysol EA9395 part A<br>8.5 g Hysol EA9395 part B<br>10 g Cat 119 | | 1 day | 4 | 5 (150 oz) | |

TABLE I-continued

Epoxy Adhesive Formulation

| ID # | Formulation | Cure Condition | Total Cure Time (R.T.) | Plating Texture (Graininess) | ASTM D3359 Tape Test Patch (oz) | Bondline (oz) |
|---|---|---|---|---|---|---|
| 63 | 50 g Hysol EA9323 part A<br>50 g Hysol EA9323 part B | | 2 days | 3 | 0<br>(20 oz) | |
| 64 | 50 g Hysol EA9323 part A<br>50 g Hysol EA9323 part B<br>10% Cat 119 | | 1 day | 4 | 0<br>(20 oz) | |
| 65 | 50 g Hysol EA9323 part A<br>50 g Hysol EA9323 part B<br>20% Cat 119 | | 1 day | 4 | 1<br>(150 oz) | |
| 66 | 3M 2214NMF | 100° C./1 hr<br>121° C./<br>3.5 hr | 4 days | 4 | 0<br>(20 oz) | |
| 67 | 50 g 3M 2214NMF<br>10% Cat 119 | 100° C./1 hr<br>121° C./<br>3.5 hr | 4 days | 4 | 0<br>(20 oz) | |
| 68 | 50 g 3M 2214NMF<br>20% Cat 119 | 100° C./1 hr<br>121° C.<br>3.5 hr | 4 days | 4 | 0<br>(20 oz) | |
| 69 | 50 g Hysol EA9394 part A<br>8.5 g Hysol EA9394 part B | | 1 day | 4 | 4<br>(150 oz) | |
| 70 | 50 g Hysol EA9394 part A<br>8.5 g Hysol EA9394 part B<br>10% Cat 119 | | 1 day | 4 | 4<br>(150 oz) | |
| 71 | 50 g Hysol EA9394 part A<br>8.5 g Hysol EA9394 part B<br>20% Cat 119 | | 1 day | 4 | 4<br>(150 oz) | |
| 72 | 50 g Hysol EA9396 part A<br>15 g Hysol EA9396 part B | | 1 day | 3– | 1<br>(150 oz) | |
| 73 | 50 g Hysol EA9396<br>part A<br>15 g Hysol EA9396<br>part B<br>10% Cat 119 | | 1 day | 4 | 3<br>(150 oz) | |
| 76 | Hysol 1-C<br>10% Cat 119<br>1% Epoxy Silane | | 1 day | 4 | 0<br>(150 oz) | |
| 77 | Hysol 1-C<br>20% Cat 119<br>1% Epoxy Silane | | 1 day | 4 | 0<br>(150 oz) | |
| 78 | Hysol 1-C<br>10% Cat 119 | | 1 day | 4 | 3<br>(150 oz) | |
| 79 | Hysol 1-C<br>20% Cat 119 | | 1 day | 4 | 3<br>(150 oz) | |

TABLE II

Cyanate Ester Adhesive Formulation

| Formulation | Cure Condition | Total Cure Time (R.T.) | Tackiness (exposed side) | Plating Texture (Graininess) | ASTM D3359 Tape Test 90 oz | 135 oz | 150 oz |
|---|---|---|---|---|---|---|---|
| Bryte 083194-1M<br>10% cat 119 | 200° C./<br>1.5 hr | | slightly tacky | 5 | 2 | | |
| Bryte 1502 | 225° C./<br>3 hr | | tacky | 5 | 4 | | |
| E083194-1M<br>10% cat 119 | 200° F./<br>1.5 hrs | | slightly tacky | 5 | 1+ | | |
| EX 1502 | 225° F./<br>3 hrs | | tacky | 5 | 4+ | | |
| E083194-1M | 175° F./<br>7.5 hrs | | tacky | 5 | | | 4 |
| E083194-1M | 150° F./<br>17 hrs | | tacky | 5 | | | 2+ |
| EX 1502 | 225° F./<br>3 hrs | | tacky | 3 | | | 3 |
| EX 1502 | 200° F./<br>4 hrs | | tacky | 3 | | | 2 |

TABLE II-continued

Cyanate Ester Adhesive Formulation

| Formulation | Cure Condition | Total Cure Time (R.T.) | Tackiness (exposed side) | Plating Texture (Graininess) | ASTM D3359 Tape Test 90 oz | 135 oz | 150 oz |
|---|---|---|---|---|---|---|---|
| E083194-1M | 200° F./ 1.5 hrs | | tacky | 4 | | 3+ | |
| E083194-1M 10% cat 119 | 200° F./ 1.5 hrs | | slightly tacky | 4 | | 5 | |
| E083194-1M 20% cat 119 | 200° F./ 1 hr | | slightly tacky | 3 | | 3 | |
| E083194-1M | 175° F./ 3.5 hrs | | tacky | 4 | | 4+ | |
| E083194-1M | 130° F./ 15 hrs | | tacky | 4 | | 1 | |
| EX 1502 | 250° F./ 1.5 hrs | | tacky | 4 | | 0 | |
| E083194-IM 20% cat 119 | 200° F./ 3.5 hrs | | slightly tacky | 4 | | 4 | |
| EX 1502 | 250° F./ 3.5 hr | 16 hrs | tacky | 4 | | | 4 |
| E083194-IM | 200° F./ 3.5 hrs | 16 hrs | tacky | 3– | | | 1 |

TABLE III

Epoxy - Cyanate Ester (powder) Formulation

| Formulation | Cure Condition | Total Cure Time (R.T.) | Tackiness (exposed side) | Plating Texture (graininess) | ASTM D3359 Tape Test (150 oz) Patch | Bond Line |
|---|---|---|---|---|---|---|
| 1.5 g Epon 8l5 0.50 g CE powder BTCy-1 (25 μm) 0.18 g TEPA | Against steel coated with EF-179 | 20 days | non-tacky laminated | 5 | 5– | |
| 1.5 g Epon 815 0.50 g CE powder 083194-1M (25 μm) 0.18 g TEPA | Against steel coated with EF-179 | 20 days | non-tacky laminated | 4 | 5 | |
| 1.5 g Epon 815 0.50 g CE powder EX1515 (25 μm) 0.18 g TEPA | Against steel coated with EF-179 | 20 days | non-tacky laminated | 4 | 4+ | |
| 1.5 g Epon 828 0.50 g CE powder BTCy-1 (25 μm) 0.18 g TEPA | Against steel coated with EF-179 | 20 days | non-tacky laminated | 3 | 5 | |
| 1.5 g Epon 828 0.50 g CE powder BTCy-1 (25 μm) 0.18 g TEPA | Exposed in air | 21 days | slightly tacky | 4 | 5 | |
| 1.5 g Epon 828 0.50 g CE powder 083194-1M (25 μm) 0.18 g TEPA | Exposed in air | 21 days | tacky | 3 | 5 | |
| 1.5 g Epon 828 0.50 g CE powder EX1515 (25 μm) 0.18 g TEPA | Exposed in air | 21 days | very tacky | 4 | 5 | |
| 1.5 g Epon 815 0.50 g CE powder BTCy-1 (25 μm) 0.18 g TEPA | Exposed in air | 6 days | tacky | 4 | 5 | |
| 1.5 g Epon 815 0.50 g CE powder BTCy-1 (25 μm) 0.18 g TEPA | Against Teflon | 6 days | non-tacky Iaminated | 4 | 0 | |

TABLE III-continued

Epoxy - Cyanate Ester (powder) Formulation

| Formulation | Cure Condition | Total Cure Time (R.T.) | Tackiness (exposed side) | Plating Texture (graininess) | ASTM D3359 Tape Test (150 oz) Patch | Bond Line |
|---|---|---|---|---|---|---|
| 1.5 g Epon 815<br>0.50 g CE powder EX1515 (25 μm)<br>0.18 g TEPA | Exposed in air | 7 days | tacky | 4 | 5 | |
| 1.5 g Epon 815<br>0.50 g CE powder EX 1515 (25 μm)<br>0.18 g TEPA | Against Teflon | 7 days | non-tacky laminated | 4 | 0 | |
| 1.5 g Epon 815<br>0.50 g CE powder EX1515 (25 μm)<br>0.18 g TEPA | 150° F./2 hrs | 7 days | slightly tacky | 4 | 0 | |
| 1.5 g Epon 815<br>0.50 g CE powder 083194-1M (25 μm)<br>0.18 g TETA | Exposed in air | 8 days | tacky | 4 | 5 | |
| 1.5 g Epon 815<br>0.50 g CE powder 083194-1M (25 μm)<br>0.18 g TETA | Against Teflon | 8 days | non-tacky laminated | 4 | 0 | |
| 1.5 g Epon 815<br>0.50 g CE powder 083194-1M (25 μm)<br>0.18 g TETA | 150° F./2 hrs | 7 days | slightly tacky | 3 | 2+ | |
| 1.5 g Epon 815<br>0.50 g CE powder BTCy-1 (25 μm)<br>0.18 g TETA | 150° F./2 hrs | 7 days | slightly tacky | 3 | 0 | |
| 1.5 g Epon 815<br>0.50 g CE powder EX1515 (25 μm)<br>0.18 g TETA | Exposed in air | 5 days | tacky | 4 | 5 | |
| 1.5 g Epon 815<br>0.50 g CE powder EX1515 (25 μm)<br>0.18 g TETA | Against Teflon | 8 days | non-tacky laminated | 4 | 3 | |
| 2.0 g Epon 815<br>1.0 g CE powder 083194-1M (45 μm)<br>0.24 g TETA | bondline exposed to air, patch against Teflon | 4 days | tacky | 3 | 4+ | 4 |
| 0.50 g Epon 815<br>0.50 g Epon 828<br>0.50 g CE powder EX1502 (45 μm)<br>0.12 g TETA | Exposed to air | 4 days | tacky | 3− | 2 | |
| 0.50 g Epon 815<br>0.50 g Epon 828<br>0.50 g CE powder EX1502 (45 μm)<br>0.12 g TETA | Against Teflon | 4 days | non-tacky laminated | 2 | 3− | |
| 0.50 g Epon 815<br>0.50 g Epon 828<br>0.50 g CE powder BTCy-1 (45 μm)<br>0.12 g TETA | Exposed to air | 4 days | tacky | 4 | 4+ | |
| 0.50 g Epon 815<br>0.50 g Epon 828<br>0.50 g CE powder BTCy-1 (45 μm)<br>0.12 g TETA | Against Teflon | 4 days | non-tacky laminated | 3 | 1 | |
| 1.0 g B.F. Goodrich 1177A&B<br>0.50 g CE powder EX1502 (45 μm) | Exposed to air | 7 days | slightly tacky | 5 | 5 | |
| 1.0 g B.F. Goodrich 1177A&B<br>0.50 g CE powder EX1502 (45 μm) | Against Teflon | 7 days | non-tacky laminated | 5 | 0 | |
| 1.0 g B.F. Goodrich 1177A&B<br>0.50 g CE powder BTCy-1 (45 μm) | Exposed to air | 7 days | slightly tacky | 5 | 5 | |

TABLE III-continued

Epoxy - Cyanate Ester (powder) Formulation

| Formulation | Cure Condition | Total Cure Time (R.T.) | Tackiness (exposed side) | Plating Texture (graininess) | ASTM D3359 Tape Test (150 oz) Patch | Bond Line |
|---|---|---|---|---|---|---|
| 1.0 g B.F. Goodrich 1177A&B<br>0.50 g CE powder BTCy-1 (45 μm) | Against Teflon | 7 days | non-tacky laminated | 5 | 0 | |
| 1.0 g Epon 815<br>0.50 g Epon 828<br>0.50 g CE powder BTCy-1 (45 μm)<br>0.18 g TETA | Exposed to air | 6 days | slightly tacky | 4 | 4+ | |
| 1.0 g Epon 815<br>0.50 g Epon 828<br>0.50 g CE powder BTCy-1 (45 μm)<br>0.18 g TETA | Against Teflon | 6 days | non-tacky laminated | 4 | 4 | |
| 0.50 g Epon 815<br>0.50 g Epon 828<br>0.50 g CE powder EX1515 (45 μm)<br>0.12 g TETA | Exposed to air | 5 days | tacky | 3 | 1+ | |
| 0.50 g Epon 815<br>0.50 g Epon 828<br>0.50 g CE powder EX1515 (45 μm)<br>0.12 g TETA | Against Teflon | 5 days | non-tacky laminated | 2 | 2- | |
| 1.0 g B.F. Goodrich 1177A&B<br>0.50 g CE powder BTCy-1(45 μm) | Against Teflon | 7 days | slightly tacky | 3 | 1+ | |
| 1.0 g Epon 815<br>0.50 g Epon 828<br>0.50 g CE powder EX1515 (45 μm)<br>0.18 g TETA | Exposed to air | 5 days | slightly tacky | 3 | 3+ | |
| 1.25 g Epon 815<br>0.25 g CE powder BTCy-1 (45 μm)<br>0.25 g TETA | Against Teflon | 4 days | non-tacky laminated | 4 | 5 | |
| 0.75 g Epon 815<br>0.50 g Epon 828<br>0.25 g CE powder BTCy-1 (45 μm)<br>0.25 g TETA | Exposed to air | 4 days | slightly tacky | 3 | 0 | |
| 0.75 g Epon 815<br>0.50 g Epon 828<br>0.25 g CE powder BTCy-1 (45 μm)<br>0.25 g TETA | Against Teflon | 4 days | non-tacky laminated | 4 | 5 | |

Accordingly, it has been demonstrated that an adhesive formulated in accordance with the invention is successfully plated with metals after having been subjected to surface texturing.

INDUSTRIAL APPLICABILITY

The adhesives of the invention are expected to be successfully employed in industries involving the metal plating of custom formulated plastic parts. Particularly, the adhesives of the invention are expected to find utility in such industrial applications as the manufacture of automobiles, motorhomes, aircraft, boats, and manufactured homes.

Thus, there has been disclosed an adhesive for bonding cyanate ester composites together, with the adhesive capable of adhering to subsequently-plated metal after having been etched in a surface texturing process. Moreover, a method of formulating the present adhesive formulations is provided as well as a method for bonding cyanate ester composite articles with the present adhesives. It will be readily apparent to those of ordinary skill in this art that various changes and modifications of an obvious nature may be made without departing from the spirit of the invention, and all such changes and modifications are considered to fall within the scope of the invention, as defined by the appended claims.

What is claimed is:

1. A method for bonding cyanate ester composite articles to one another, said cyanate ester composite articles each having a surface, said method comprising:
   (a) preparing an adhesive according to steps comprising:
      (i) providing a cured cyanate ester polymer in powder form; and
      (ii) mixing said cured cyanate ester polymer with a polymer mixture to form a thoroughly wetted mass, said polymer mixture comprising at least one polyepoxide resin and a substantially stoichiometric amount of curing agent.
   (b) applying said adhesive to said surface of at least one of said cyanate ester composite articles to be bonded;

(c) positioning said cyanate ester composite articles to form a mated assembly, said adhesive therebetween and in contact with each of said cyanate ester composite articles; and (d) allowing said adhesive to cure, thereby bonding said cyanate ester composite articles to one another.

2. The method of claim 1 further comprising a step (b') following said step (a) and preceding said step (b), step (b') comprising freezing said adhesive for storage and thereafter thawing said frozen adhesive for use.

3. The method of claim 1 wherein said at least one polyepoxide resin has a viscosity not exceeding about 30,000 cP at room temperature and is selected from the group consisting of diglycidyl ethers of Bisphenol A and diglycidyl ethers of Bisphenol F.

4. The method of claim 3 wherein said at least one polyepoxide resin is selected from the group consisting of (a) a mixture comprising 11% butyl glycidyl ether and 89% diglycidyl ether of Bisphenol A, said mixture having an epoxy equivalent weight within the range of about 175 to 195, and (b) diglycidyl ether of Bisphenol A having an epoxy equivalent weight within the range of about 185 to 192.

5. The method of claim 1 wherein said curing agent comprises at least one aliphatic polyamine and optionally further comprises at least one catalytic curing agent.

6. The method of claim 5 wherein said at least one aliphatic polyamine is selected from the group consisting of triethylenetetramine and tetraethylenepentamine and said at least one catalytic curing agent is selected from the group consisting of tris (dimethyl-amino) methyl phenol and amine-terminated butadiene-nitrile rubber.

7. The method of claim 1 wherein said filler is present in said adhesive in an amount ranging from about 15 to 50 vol % and wherein said cured cyanate ester polymer is in powder form comprising nominally spheroidal particles having an average diameter of less than about 25 $\mu$m.

8. A method for forming and plating an assembly of cyanate ester composite articles, each of said cyanate ester composite articles having a surface, said method comprising the steps of (a) preparing an adhesive according to the steps comprising:
   (i) providing a cured cyanate ester polymer in powder form; and
   (ii) mixing said cured cyanate ester polymer with a polymer mixture to form a thoroughly wetted mass, said polymer mixture comprising at least one polyepoxide resin and a substantially stoichiometric amount of curing agent;

(b) applying said adhesive to said surface of at least one of said cyanate ester composite articles to be bonded;

(c) positioning said cyanate ester composite articles to form a mated assembly, said adhesive therebetween and in contact with said surface of each of said cyanate ester composite articles;

(d) allowing said adhesive to cure, thereby bonding said cyanate ester composite articles to one another to form an assembly, said assembly having a surface;

(e) chemically etching said surface of said assembly, including any of said adhesive exposed at said surface of said assembly; and (f) plating said surface of said assembly such that said surface of said assembly is completely covered with metal, including said adhesive exposed at said surface of said assembly.

* * * * *